United States Patent
Fei et al.

(10) Patent No.: US 10,907,893 B2
(45) Date of Patent: Feb. 2, 2021

(54) FRESH DRAWER AND REFRIGERATOR USING SAME

(71) Applicant: QINGDAO HAIER JOINT STOCK CO., LTD., Qingdao (CN)

(72) Inventors: Bin Fei, Qingdao (CN); Riyong Lu, Qingdao (CN); Jinlin Liu, Qingdao (CN); Xiaobing Zhu, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 384 days.

(21) Appl. No.: 15/744,817

(22) PCT Filed: Aug. 15, 2016

(86) PCT No.: PCT/CN2016/095267
§ 371 (c)(1),
(2) Date: Jan. 14, 2018

(87) PCT Pub. No.: WO2017/113809
PCT Pub. Date: Jul. 6, 2017

(65) Prior Publication Data
US 2018/0209720 A1    Jul. 26, 2018

(30) Foreign Application Priority Data

Dec. 29, 2015 (CN) .......................... 2015 1 1023130

(51) Int. Cl.
*F25D 17/04* (2006.01)
*F25D 25/02* (2006.01)
(Continued)

(52) U.S. Cl.
CPC .......... *F25D 25/025* (2013.01); *A23L 3/3409* (2013.01); *F25D 17/042* (2013.01); *F25D 29/00* (2013.01)

(58) Field of Classification Search
CPC .... F25D 17/042; F25D 17/045; F25D 17/047; F25D 25/025; A23L 3/3418;
(Continued)

(56) References Cited

U.S. PATENT DOCUMENTS

| | | | | |
|---|---|---|---|---|
| 5,046,332 A * | 9/1991 | Herrmann | ............. | A23L 3/3418 62/388 |
| 6,090,422 A * | 7/2000 | Taragan | ................ | A23L 3/0155 426/231 |
| 2014/0166671 A1* | 6/2014 | Downie | .................... | F17C 5/02 220/581 |

FOREIGN PATENT DOCUMENTS

| | | | |
|---|---|---|---|
| CN | 102288005 A | * | 12/2011 |
| CN | 102288005 A | | 12/2011 |

(Continued)

*Primary Examiner* — Frantz F Jules
*Assistant Examiner* — Erik Mendoza-Wilkenfel
(74) *Attorney, Agent, or Firm* — Cheng-Ju Chiang

(57) ABSTRACT

A fresh drawer and a refrigerator using same. The fresh drawer comprises: a drawer body, wherein a storage chamber for storing food is provided inside the drawer body, and the storage chamber is of an openable sealed structure; a gas supplier, used for providing fresh-keeping gas for the storage chamber; and a pressure balancer, used for balancing air pressure inside the storage chamber. In the fresh drawer and the refrigerator using same, air in an inner storage chamber is replaced with fresh-keeping gas such as nitrogen and oxygen, to provide a modified atmosphere for a food storage space, such that the shelf life of food can be greatly extended.

10 Claims, 7 Drawing Sheets

(51) Int. Cl.
*A23L 3/34* (2006.01)
*F16K 15/18* (2006.01)
*A23L 3/3409* (2006.01)
*F25D 29/00* (2006.01)

(58) Field of Classification Search
CPC .... A23L 3/3445; A23L 3/3409; F16K 15/183; F16K 27/0209
See application file for complete search history.

(56) References Cited

FOREIGN PATENT DOCUMENTS

| | | | | |
|---|---|---|---|---|
| CN | 103575050 A | 2/2014 | | |
| CN | 104101158 A | 10/2014 | | |
| CN | 105674676 A | 6/2016 | | |
| DE | 102013205867 A1 | * 10/2014 | ............ | F25D 23/12 |
| WO | 2007/020585 A1 | 2/2007 | | |

* cited by examiner

FRESH DRAWER AND REFRIGERATOR USING SAME

CROSS REFERENCE TO RELATED APPLICATIONS

The present application is a 35 U.S.C. § 371 National Phase conversion of International (PCT) Patent Application No. PCT/CN2016/095267, filed on Aug. 15, 2016, which further claims benefit of Chinese Patent Application No. 201511023130.8, filed on Dec. 29, 2015, the disclosure of which is incorporated by reference herein. The PCT International Patent Application was filed and published in Chinese.

TECHNICAL FIELD

The present invention relates to the technical field of freshness preservation of a refrigerator, and more particularly, to a fresh drawer capable of realizing food freshness preservation by regulating internal gas components, and a refrigerator using the fresh drawer.

BACKGROUND

With the accelerated pace of life and the development of life quality, people put forward more and more requirements on the freshness preservation durability and freshness preservation extent of food.

Conventionally, the lifetime of food in a refrigerator is prolonged by regulating the temperature and humidity, but it is impossible to hypnotize food (the metabolic rate is extremely low), especially fresh fruits, just by regulating the temperature and humidity. In this case, it is only possible to slow down the metabolism, which is far below the requirements of modern people on the freshness preservation extent and durability of food.

According to a more advanced technology, a vacuum freshness preservation device or a fast-cooling freshness preservation device are additionally provided in a refrigeration compartment of the refrigerator. By additionally providing such two freshness preservation devices, the freshness preservation effect of the refrigerator will be better than that of conventional refrigerators, but it still cannot achieve the effect of hypnotizing food.

It is well-known that the replacement of air in a food preservation environment with nitrogen and other inactive gases can achieve the effect of hypnotizing fresh fruits, and the increase of content of oxygen in the food preservation environment can realize the effects of keeping raw shrimp, fish and other living things alive and greatly prolong the freshness preservation lifetime of food. But, neither a device nor a method for controlling internal gas components is provided for the existing refrigerator.

It will be possible to cause an increased gas pressure inside a storage chamber in the process of charging fresh-keeping gas into the storage chamber. In contrast, gas inside the storage component contracts in coldness following temperature drop in a refrigerating process of the refrigerator, such that a negative pressure occurs due to the gas pressure drop. It is possible to provide a pressure balancing mechanism to balance the gas pressure inside the storage chamber to prevent a too high or too low gas pressure.

SUMMARY

Objects of the present invention are to provide a fresh drawer capable of realizing food freshness preservation by regulating internal gas components, and a refrigerator using the fresh drawer.

To achieve one of the objects of the present invention, the invention adopts the following technical solutions: a fresh drawer comprises a drawer body which is provided with a storage chamber therein for storing food, the storage chamber being of an openable sealed structure; a gas supplier for supplying fresh-keeping gas to the storage chamber; and a pressure balancer for balancing the gas pressure inside the storage chamber.

As an improved technical solution of the present invention, the drawer body comprises a cover body, a box body and a door body, wherein the box body is movable with respect to the cover body in a depth direction of a refrigerator to open or close the storage chamber, and the door body is provided at the outer side of the refrigerator in the depth direction and used for heat preservation.

As a further improved technical solution of the present application, the drawer body is provided with a gas supply compartment therein for placement of the air supply mechanism, and the air supply compartment is communicated with the storage chamber via a gas passage.

As a further improved technical solution of the present invention, the air supply mechanism comprises a gas cylinder for storing fresh-keeping gas, and a pressure relief valve is also connected to the gas cylinder.

As a further improved technical solution of the present invention, a gas discharge passage and a gas suction passage which are unidirectionally opened and have opposite opening directions are provided in the pressure balancer; a gas inlet end of the gas discharge passage is communicated with an inside of the storage chamber, and a gas outlet end of the gas discharge passage is communicated with an outside of the storage chamber; a gas outlet end of the gas suction passage is communicated with the inside of the storage chamber, and a gas inlet end of the gas suction passage is communicated with the outside of the storage chamber.

As a further improved technical solution of the present invention, the pressure balancer comprises a base and check valves, wherein, the base is used for mounting the check valves; the check valve in the gas discharge passage is provided to be opened outwards from the inside of the storage chamber; the check valve in the gas suction passage is provided to be opened inwards from the outside of the storage chamber.

As a further improved technical solution of the present invention, the check valve is provided in a vertical direction and comprises a valve body and a valve core bead, wherein an inner wall of the valve body contracts inwards radially to form an annular stop portion, and the valve core bead is laid on the stop portion and is matched with the stop portion to enable opening or closing of the check valve.

As a further improved technical solution of the present invention, the gas inlet end of the gas discharge passage and the gas outlet end of the gas suction passage are communicated with the inside of the storage chamber respectively via a first port, and the gas outlet end of the gas discharge passage and the gas inlet end of the gas suction passage are communicated with the inside of a refrigerator compartment outside the storage chamber respectively via a second port.

As a further improved technical solution of the present invention, the second port is communicated with a ventilation pipeline, and the ventilation pipeline is communicated with an outside of the refrigerator.

To achieve another object, the invention adopts the following technical solutions: a refrigerator comprises a fresh drawer, wherein the fresh drawer comprises a drawer body which is provided with a storage chamber therein for storing food, the storage chamber being of an openable sealed structure; a gas supplier for supplying fresh-keeping gas to the storage chamber; a pressure balancer for balancing the gas pressure inside the storage chamber.

As an improved technical solution of the present invention, the drawer body comprises a cover body, a box body and a door body, wherein the box body is movable with respect to the cover body in a depth direction of the refrigerator to open or close the storage chamber, and the door body is provided at the outer side of the refrigerator in the depth direction and used for heat preservation.

As a further improved technical solution of the present application, the drawer body is provided with a gas supply compartment therein for placement of the gas supplier, and the gas supply compartment is communicated with the storage chamber via a gas passage.

As a further improved technical solution of the present invention, the gas supplier comprises a gas cylinder for storing fresh-keeping gas, and a pressure relief valve is also connected to the gas cylinder.

As a further improved technical solution of the present invention, a gas discharge passage and a gas suction passage which are unidirectionally opened and have opposite opening directions are provided in the pressure balancer; a gas inlet end of the gas discharge passage is communicated with an inside of the storage chamber, and a gas outlet end of the gas discharge passage is communicated with an outside of the storage chamber; a gas outlet end of the gas suction passage is communicated with the inside of the storage chamber, and a gas inlet end of the gas suction passage is communicated with the outside of the storage chamber.

As a further improved technical solution of the present invention, the pressure balancer comprises a base and check valves, wherein, the base is used for mounting the check valves; the check valve in the gas discharge passage is provided to be opened outwards from the inside of the storage chamber; the check valve in the gas suction passage is provided to be opened inwards from the outside of the storage chamber.

As a further improved technical solution of the present invention, the check valve is provided in a vertical direction and comprises a valve body and a valve core bead, wherein an inner wall of the valve body contracts inwards radially to form an annular stop portion, and the valve core bead is laid on the stop portion and is matched with the stop portion to enable opening or closing of the check valve.

As a further improved technical solution of the present invention, the gas inlet end of the gas discharge passage and the gas outlet end of the gas suction passage are communicated with the inside of the storage chamber respectively via a first port, and the gas outlet end of the gas discharge passage and the gas inlet end of the gas suction passage are communicated with an inside of a refrigerator compartment outside the storage chamber respectively via a second port.

As a further improved technical solution of the present invention, the second port is communicated with a ventilation pipeline, and the ventilation pipeline is communicated with an outside of the refrigerator.

Compared with the prior art, the present invention has the following technical effects: according to the fresh drawer and the refrigerator using the fresh drawer, air in the storage chamber is replaced with nitrogen, oxygen and other fresh-keeping gas, such that the controlled atmosphere of a food storage space is changed, and thus the freshness preservation lifetime of food can be significantly prolonged.

DETAILED DESCRIPTION

Figure 1:
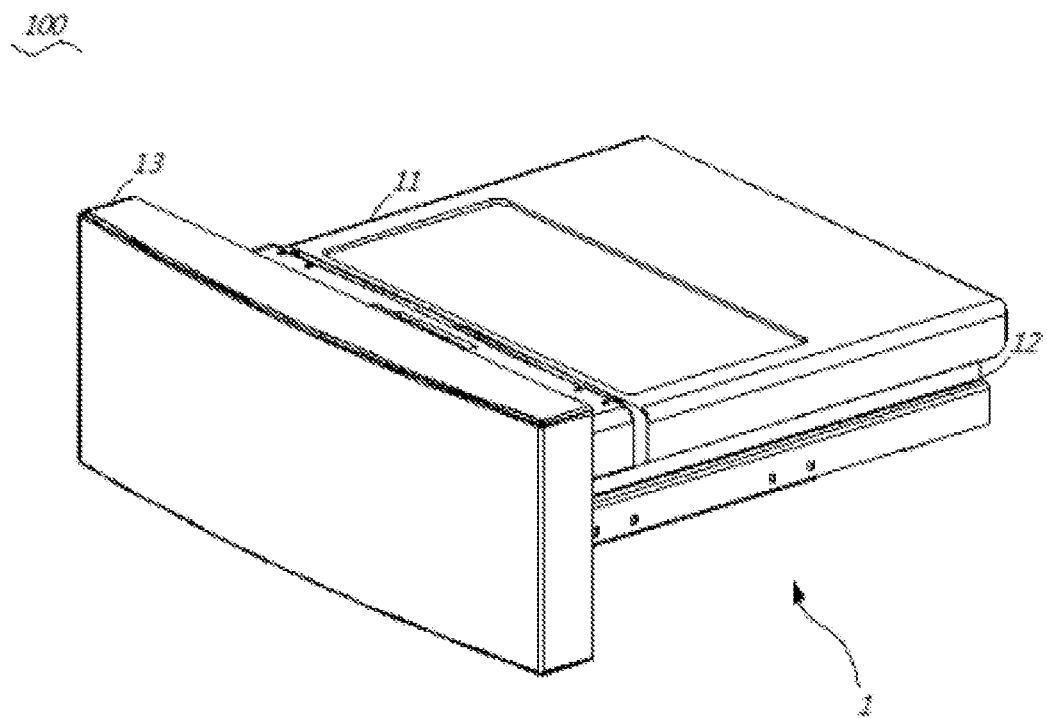
FIG. 1 is a schematically structural view of the fresh drawer in a closed state according to Embodiment 1.
Figure 2:
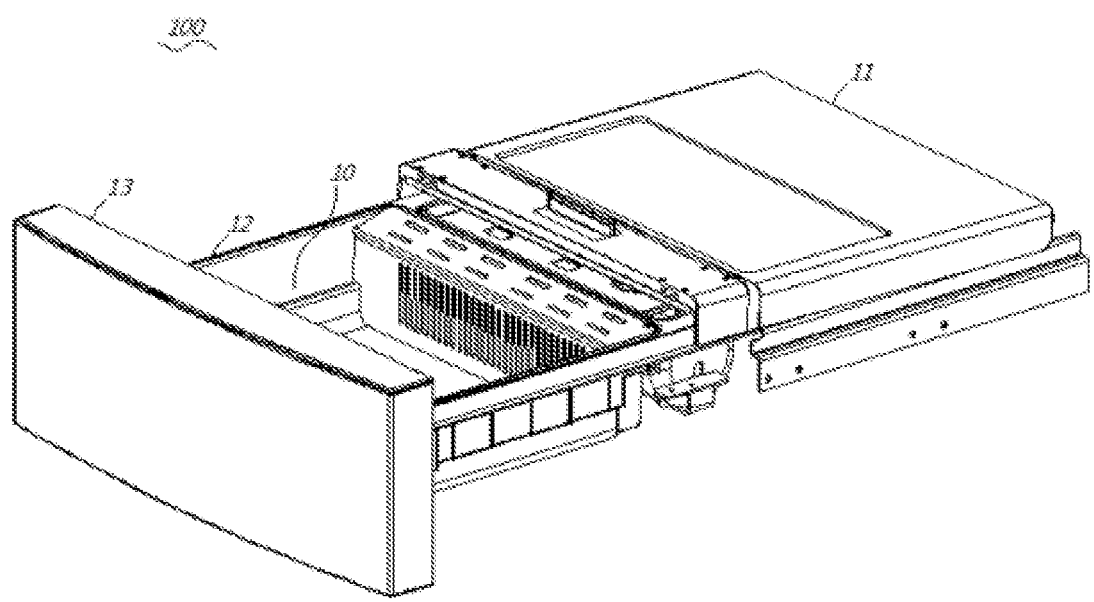
FIG. 2 is a schematically structural view of the fresh drawer in an open state according to Embodiment 1.
Figure 3:
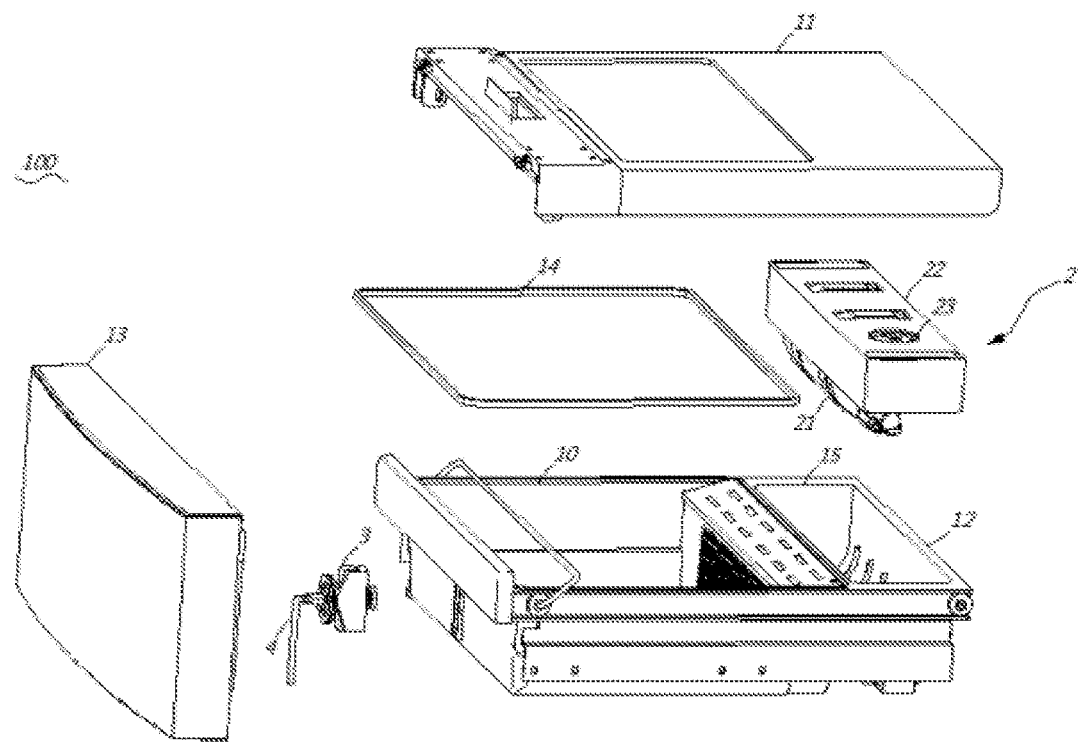
FIG. 3 is a schematically exploded structural view of the fresh drawer according to Embodiment 1.
Figure 4:
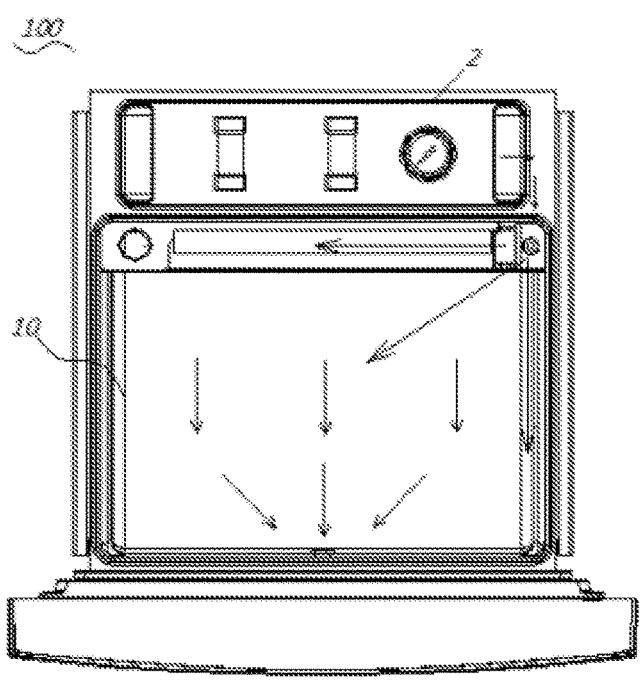
FIG. 4 is a schematic view of a flowing direction of gas when the gas supplier is supplied with the gas.

The present invention will now be described in detail with reference to specific embodiments as illustrated in the accompanying drawings. However, these embodiments are not intended to limit the present invention, and structures, methods, or functional changes made by one of ordinary skill in the art in accordance with these embodiments are included within the scope of the present invention.

The same or similar structures in the embodiments employ the same reference numerals.

Embodiment 1

Referring to FIGS. 1 to 4, the present invention provides a fresh drawer 100 comprising a drawer body 1, a gas supplier 2 and a pressure balancer 3. The drawer body 1 is provided with a storage chamber 10 therein for storing food, the storage chamber 10 being of an openable sealed structure.

In particular, the drawer body 1 comprises a cover body 11, a box body 12 and a door body 13, wherein the box body 12 is movable with respect to the cover body 11 in a depth direction of a refrigerator to open or close the storage chamber 10, and the door body 13 is provided at the outer side of the refrigerator in the depth direction and used for heat preservation. A sealing structure comprises a sealing ring 14 provided on the box body 12 and a press fit mechanism (not shown in drawings) provided on the cover body 11. When the storage chamber 10 is closed, the press fit mechanism presses the sealing ring 14 to ensure sealing of the storage chamber 10.

In this embodiment, the drawer body 1 is also provided with a gas supply compartment 15 therein for placement of the gas supplier 2, and the air supply compartment 15 is communicated with the storage chamber 10 via a gas passage. Of course, in other embodiment of the present invention, in order to ensure the maximized space of the storage chamber 10, there may be no gas supply compartment 15 provided inside the drawer body 1, while the gas supplier 2 is provided outside the drawer body 1 and communicated with the storage chamber 10 via a pipeline.

The gas supplier 2 is used for supplying fresh-keeping gas to the storage chamber 10, wherein the fresh-keeping gas may be a gas, such as nitrogen for hypnotizing fresh fruits, or oxygen for keeping raw shrimp, fish and other living things alive, which can be selected by a user according to his/her demands.

In particular, the gas supplier 2 comprises a gas cylinder 21 for storing the fresh-keeping gas. The gas cylinder 21 is fixed to a cover plate 22. The fresh-keeping gas can be charged into the storage chamber 10 via the gas passage between the gas supply compartment 15 and the storage chamber 10. In order to eliminate potential safety hazard of too-high pressure inside the gas cylinder 21, a pressure relief valve 23 is connected to the gas cylinder 21.

It will be possible to cause an increased gas pressure inside the storage chamber 10 in the process of charging the fresh-keeping gas into the storage chamber 10. In contrast, gas inside the storage component 10 contracts in coldness following temperature drop in a refrigerating process of a refrigerator, such that negative pressure occurs due to gas pressure drop (see FIG. 5). Therefore, the present invention provides a pressure balancer 3 to balance the gas pressure inside the storage chamber 10 to prevent a too high or too low gas pressure.

A gas discharge passage (see FIG. 9) and a gas suction passage (see FIG. 10) which are unidirectionally opened and have opposite opening directions are provided in the pressure balancer 3.

A gas inlet end of the gas discharge passage is communicated with an inside of the storage chamber 10, and a gas outlet end of the gas discharge passage is communicated with an outside of the storage chamber 10. When gas pressure inside the storage chamber 10 is too high, gas inside the storage chamber 10 is discharged to the outside via the gas discharge passage, such that gas pressure inside the storage chamber 10 drops.

A gas outlet end of the gas suction passage is communicated with the inside of the storage chamber 10, and a gas inlet end of the gas suction passage is communicated with the outside of the storage chamber 10. When gas pressure inside the storage chamber 10 is too low, external gas enters the storage chamber 10 via the gas suction passage, such that gas pressure inside the storage chamber 10 rises.

In particular, the pressure balancer 3 comprises a base 31 and check valves 32, wherein the base 31 is used for mounting the check valves 32. The check valve 32 in the gas discharge passage is provided to be opened outwards from the inside of the storage chamber 10. The check valve 32 in the gas suction passage is provided to be opened inwards from the outside of the storage chamber 10.

In order to ensure gas tightness of the pressure balancer 3, a mounting gap between the check valve 32 and the base 31 is charged with a sealing plug 33.

In order to ensure gas tightness of the pressure balancing mechanism 3, a mounting gap between the check valve 32 and the base 31 is charged with a sealing plug 33.

Figure 6:
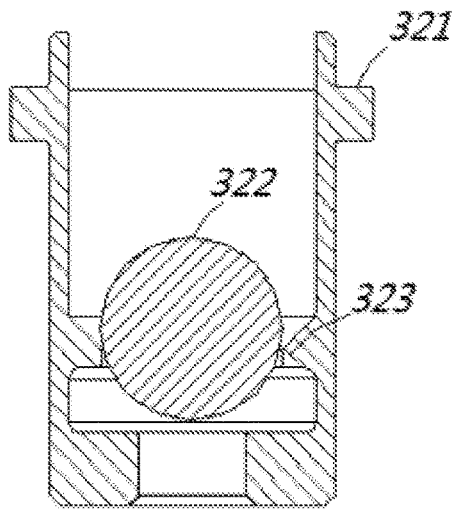
FIG. 6 is a schematically sectional structural view of the check valve.

Referring to FIG. 6, the check valve 32 is provided in a vertical direction and comprises a valve body 321 and a valve core bead 322, wherein an inner wall of the valve body 321 contracts inwards radially to form an annular stop portion 323, and the valve core bead 322 is laid on the stop portion and is matched with the stop portion to enable opening or closing of the check valve 32.

When the gas pressure faces the stop portion from the valve core bead 322, the valve core bead 322 deadly seals a gas pore in the middle of the stop portion 323 by means of the gas pressure and self weight thereof, such that the check valve 32 is closed. When the gas pressure faces the valve core bead 322 from the stop portion and is enough to offset the self weight of the valve core bead 322, the valve core bead 322 is separated from the stop portion 323, such that the check valve 32 is opened, and gas can pass through the gas pore in the middle of the stop portion.

Figure 5:
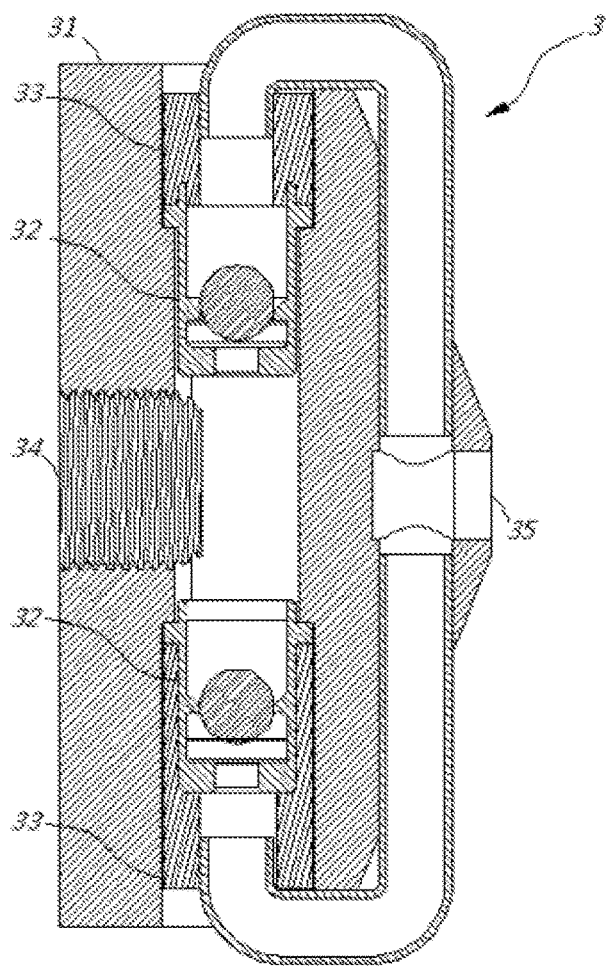
FIG. 5 is a schematically sectional structural view of the pressure balancer.

Further, going on referring to FIG. 5, in order to simplify a gas passage structure, the gas inlet end of the gas discharge passage and the gas outlet end of the gas suction passage are communicated with the inside of the storage chamber 10 respectively via a first port 34, and the gas outlet end of the gas discharge passage and the gas inlet end of the gas suction passage are communicated with an inside of a refrigerator compartment outside the storage chamber 10 respectively via a second port 35.

When the fresh-keeping gas is a hypnotic gas such as nitrogen, the hypnotic gas is directly discharged into the refrigerator compartment via the second port 35 and does not adversely affect food stored in the refrigerator compartment. However, when the fresh-keeping gas is oxygen, it is possible to accelerate the rot of food if the oxygen is directly discharged to the refrigerator compartment.

Figure 7:
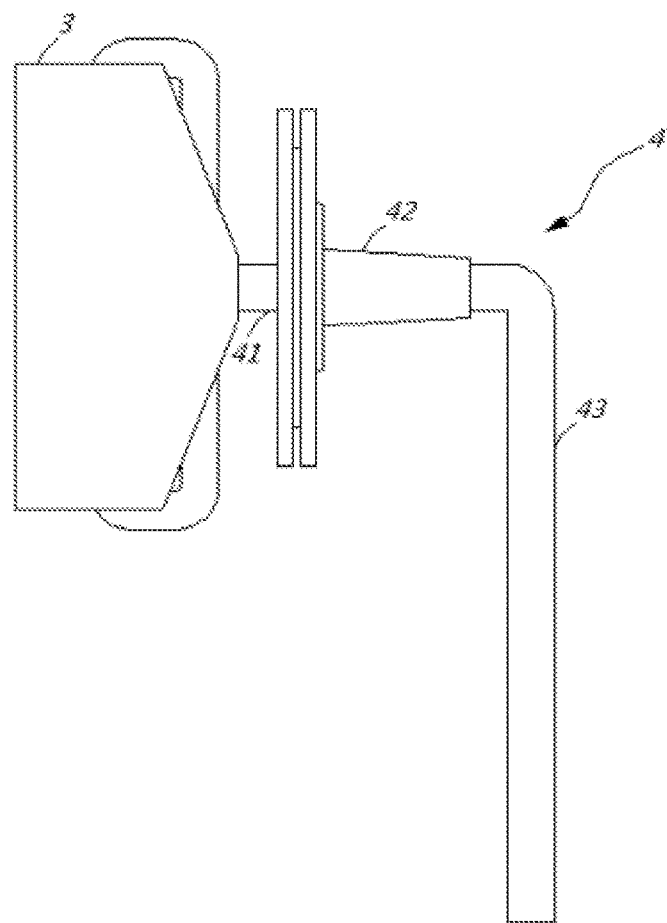
FIG. 7 is schematically structural view in which the pressure balancer is connected with the ventilation pipeline.
Figure 8:
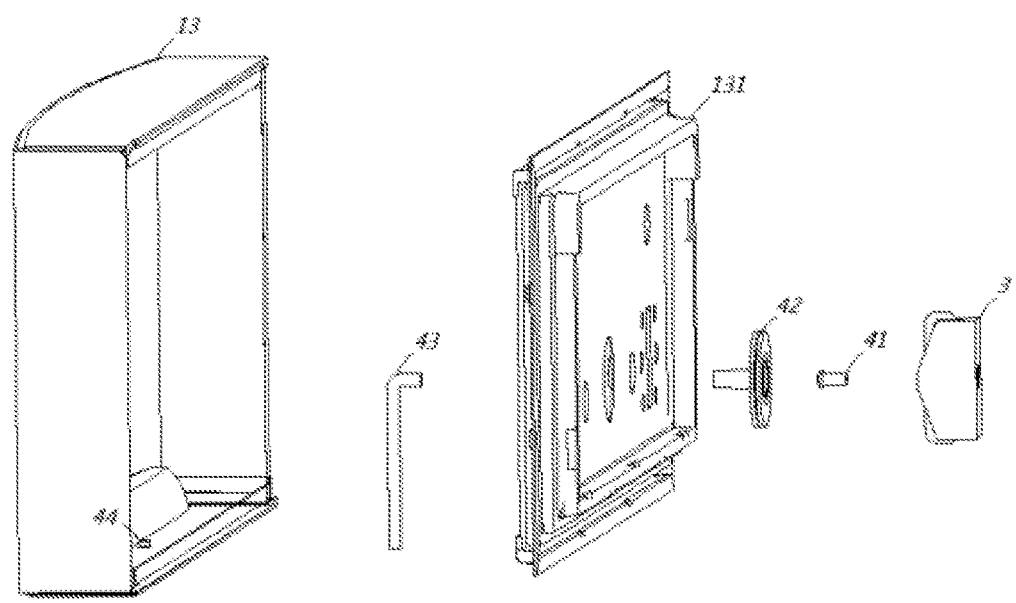
FIG. 8 is a schematically exploded structural view of the pressure balancer, the ventilation pipeline and the door body.

Further, referring to FIGS. 7 to 8, the second port 35 is communicated with a ventilation pipeline 4. The ventilation pipeline 4 sequentially comprises a gas connecting pipe 41, a gas connecting nozzle 42 and a ventilation pipe 43, wherein the gas connecting nozzle 42 is clamped on a door lining 131 of a door body 13, the gas connecting pipe 41 is used for connecting the gas connecting nozzle 42 with the second port 35, and the ventilation pipe 43 is used for connecting the gas connecting nozzle 42 with the outside of the refrigerator. Excessive fresh-keeping gas is guided to the outside of the refrigerator via the ventilation pipeline 4 and then discharged, such that the adverse affects on other foods in the refrigerator compartment can be avoided.

In particular, the ventilation pipe 43 is communicated with the outside of the refrigerator via a ventilation hole 44 in the bottom of the door body 13, thereby achieving a function of discharging gas to the outside of the refrigerator while keeping the integrally attractive appearance of the refrigerator. Because the density of most of fresh-keeping gases, such as oxygen is greater than that of air, the height of the ventilation hole 44 is set to be lower than that of the second port 35, such that gas in the storage chamber can be discharged more smoothly.

Figure 9:
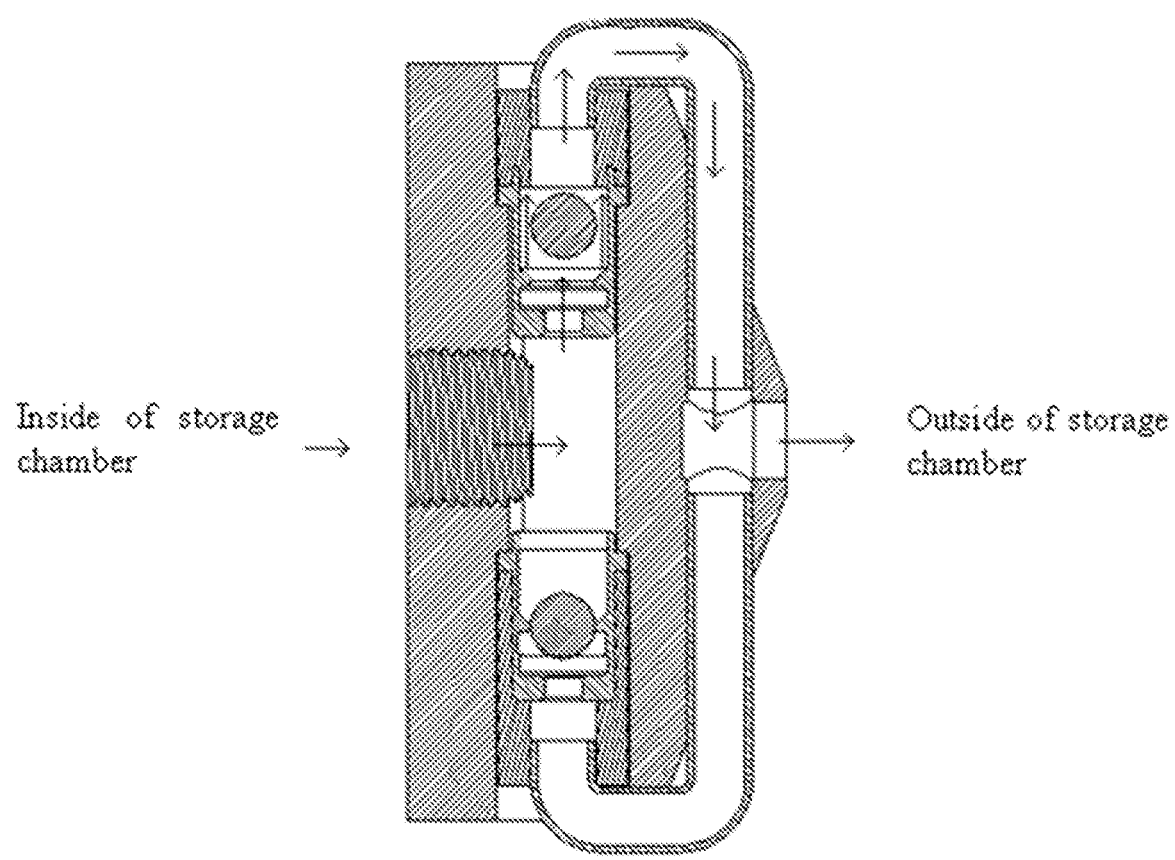
FIG. 9 is a schematic view of a flowing direction of gas in the gas discharge passage.
Figure 10:
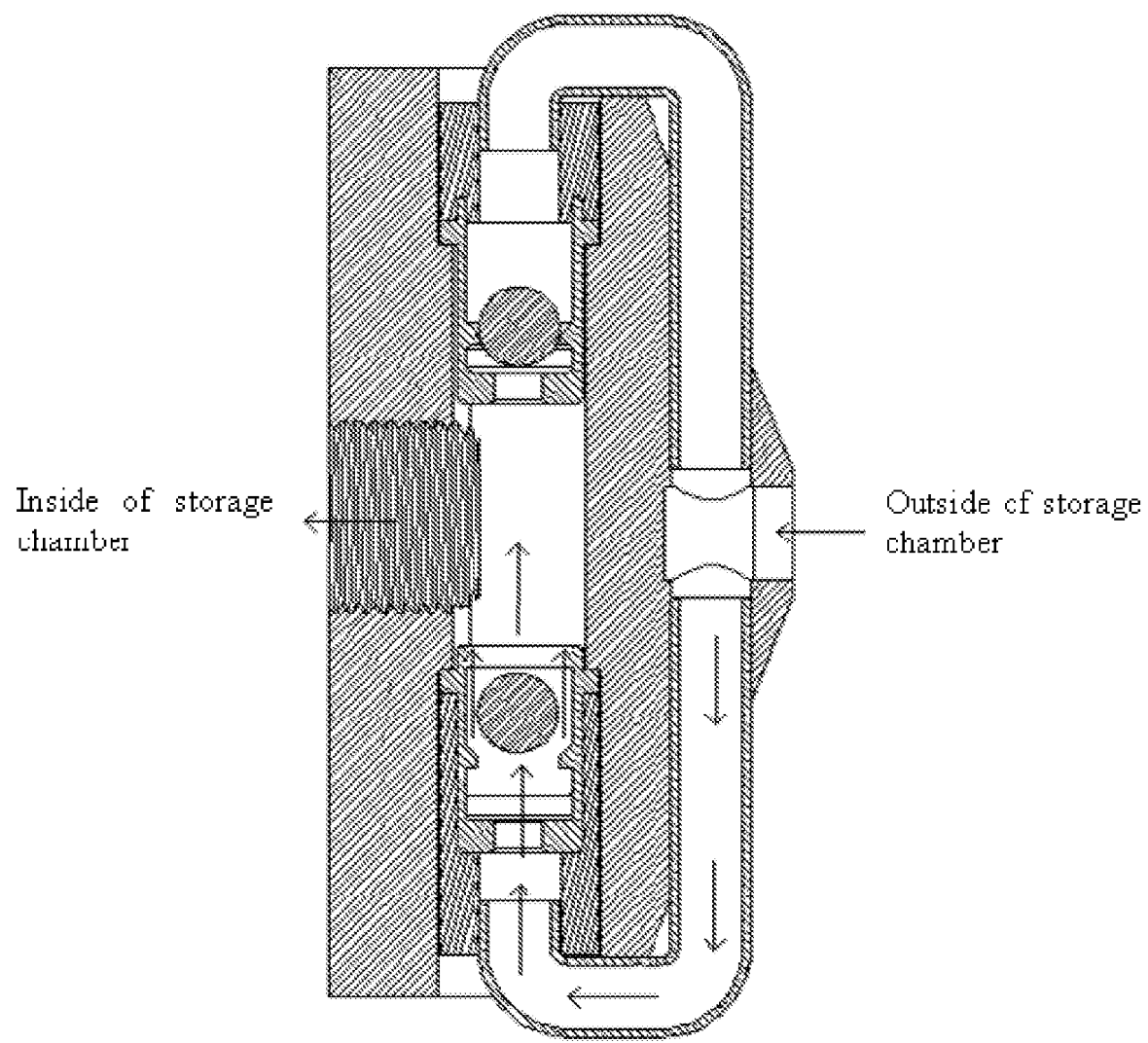
FIG. 10 is a schematic view of a flowing direction of gas in the gas suction passage.

Referring to FIGS. 9 to 10, arrows in FIG. 9 indicate a flowing direction of gas in the gas discharge passage, and arrows in FIG. 10 indicate a flowing direction of gas in the gas suction passage. When gas pressure inside the storage chamber is higher than an external gas pressure and the gas pressure is greater than the self weight of the valve core bead 322, the valve core bead 322 of the check valve 32 (the check valve 32 at the upper part) in the gas discharge passage is lift by gas, gas flow having relatively high pressure flows away from the peripheral gap of the lift valve core bead 322 to relieve pressure. Meanwhile, due to the weight and the action of positive pressure inside an area, the valve core bead 322 of the check valve 32 (the check valve 32 at the lower part) in the gas suction passage acts such that the discharged gas cannot open the check valve 32 in the gas suction passage even if it flows to the gas suction passage. In the same way, when the gas pressure inside the storage chamber is lower than the external gas pressure and the gas pressure is greater than the self weight of the valve core bead 322, the valve core bead 322 of the check valve 32 (the check valve 32 at the lower part) in the gas suction passage is lift by gas, gas flow having relatively high pressure flows away from the peripheral gap of the lift valve core bead 322 to relieve pressure. Meanwhile, due to the weight and the action of positive pressure inside an area, the valve core bead 322 of the check valve 32 (the check valve 32 at the upper part) in the gas discharge passage acts such that the sucked gas cannot open the check valve 32 in the gas discharge passage even if it is discharged to the gas suction passage.

Figure 11:
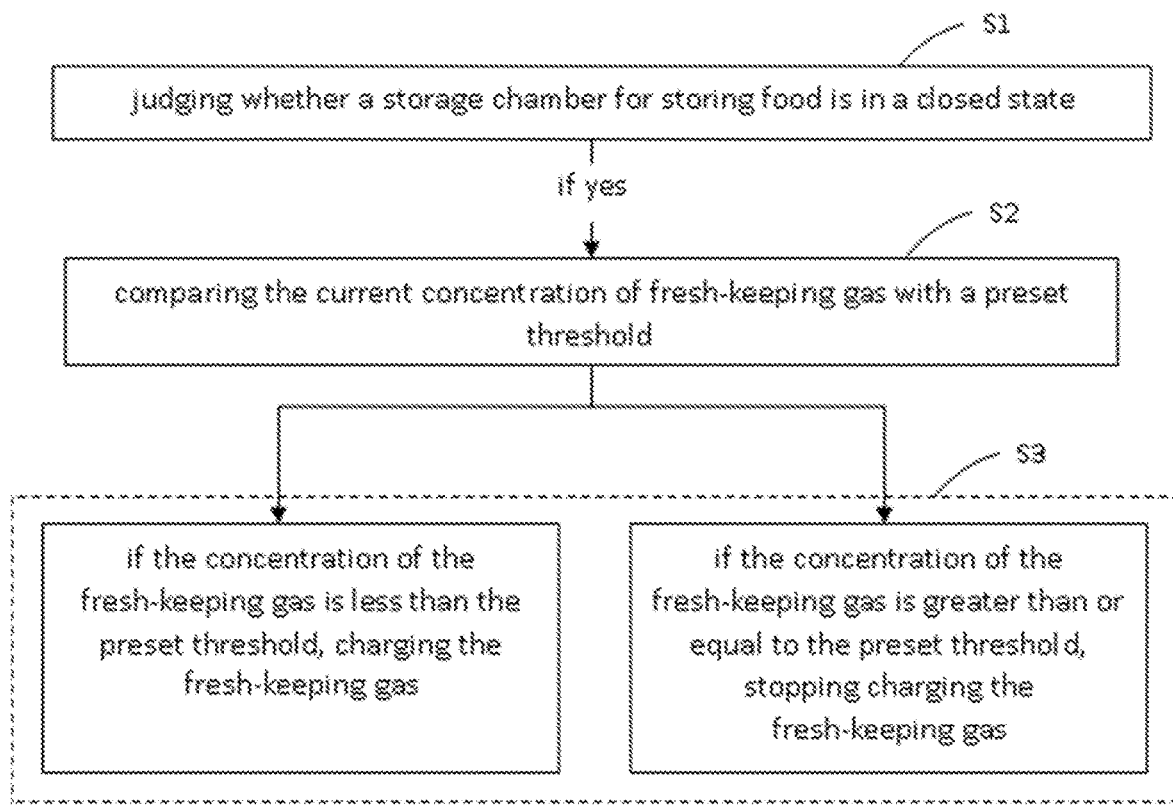
FIG. 11 is a control flowchart of a method for controlling gas concentration inside the fresh drawer.

Referring to FIG. 11, the present invention discloses a method for controlling gas concentration inside a fresh drawer, comprising the following steps: S1: judging whether a storage chamber for storing food is in a closed state; S2: if yes, acquiring the current concentration of fresh-keeping gas inside the storage chamber and comparing the current concentration with a preset threshold; if not, returning to S1; S3: if the current concentration of the fresh-keeping gas inside the storage chamber is less than the preset threshold, charging fresh-keeping gas into the storage chamber; if the current concentration of the fresh-keeping gas inside the storage chamber is greater than or equal to the preset threshold, stopping charging fresh-keeping gas into the storage chamber.

In S1, the current state of the storage chamber is judged according to an electric signal generated by a microswitch (not shown in drawings) provided on a box body.

In S2, the current concentration of the fresh-keeping gas inside the storage chamber is acquired by a gas concentration sensor provided in the storage chamber.

Figure 12:
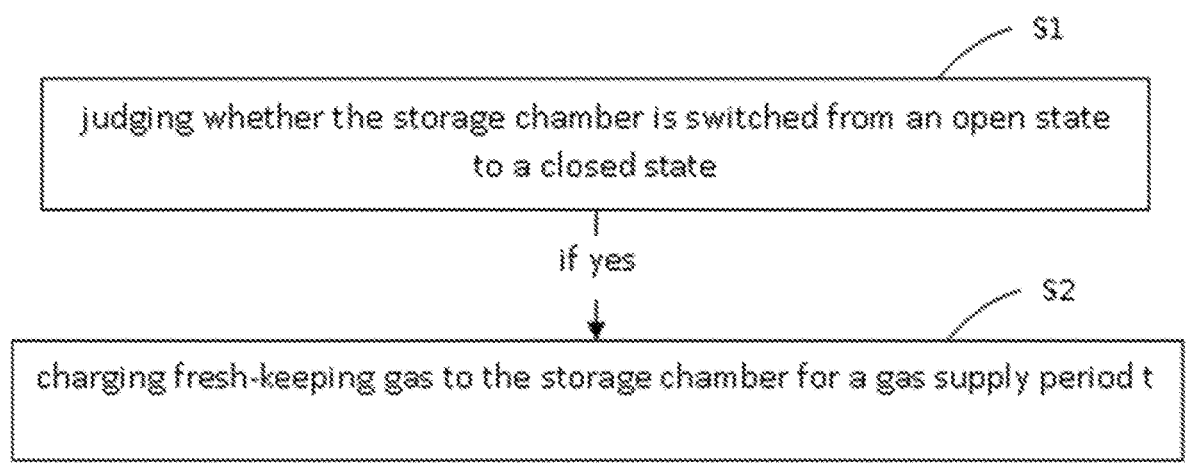
FIG. 12 is a control flowchart of a method for controlling gas concentration inside the fresh drawer.

Referring to FIG. 12, the present invention further discloses another method for controlling gas concentration inside a fresh drawer, comprising the following steps: S1: judging whether the storage chamber for storing food is switched from an open state to a closed state; S2: if yes, charging fresh-keeping gas into the storage chamber for a gas supply period t, where the gas supply time $t=v1(v2*a)$, wherein v1 is a volume of the storage chamber, v2 is a flow rate of the charged fresh-keeping gas, and a is the ventilation efficiency; if not, returning to S1.

In S1, the state switching of the storage chamber is judged according to an electric signal generated by a microswitch (not shown in drawings) provided on a box body.

In S2, it is assumed that the volume of the storage chamber is v1l, the flow rate of the fresh-keeping gas charged to the gas supplier 2 is v2l/min, and the ideal ventilation efficiency is 100%, and then $t=v1/v2$. However, in fact, owing to the difference in size of the storage chamber, and in sizes and locations of a gas inlet and a gas outlet of the storage chamber, as well as in target concentration of the fresh-keeping gas, the ventilation efficiency of the fresh-keeping gas is also different. The ventilation efficiency a can be obtained by CAE or model test, and then the gas supply time $t=v1/(v2*a)$. The gas supplier 2 supplies gas to the storage chamber during the timing period of the gas supply time until the gas supply time expires.

The present invention discloses a refrigerator. The refrigerator comprises the above-mentioned fresh drawer. The description regarding the fresh drawer refers to the above and will not be repeated here.

According to the fresh drawer and the refrigerator using the fresh drawer, air in the storage chamber is replaced with nitrogen, oxygen and other fresh-keeping gas, such that the controlled atmosphere of a food storage space is changed, and thus the freshness preservation lifetime of food can be significantly prolonged.

At last, it should be noted that the above embodiments are merely used to describe the technical solution of the present invention rather than limiting same. Although the present invention has been described in detail with reference to the above embodiments, those skilled in the art shall understand that they can still modify the technical solution recorded in the above various embodiments or equivalently replace some technical features. The essence of these modifications or replacements of the corresponding technical solutions does not depart from the spirit and scope of the technical solution in various embodiments of the present invention.

What is claimed is:

1. A fresh drawer, comprising:
   a drawer body provided with a storage chamber within the drawer body for storing food, the storage chamber being of an openable sealed structure;
   a gas supplier for supplying fresh-keeping gas to the storage chamber, and the gas supplier having a gas cylinder for storing fresh-keeping gas and a pressure relief valve connected to the gas cylinder;
   a pressure balancer for balancing the gas pressure inside the storage chamber, and having a base and check valves;
   wherein a gas supply compartment is provided in the drawer body for placement of the gas supplier, and the gas supply compartment is communicated with the storage chamber via a gas passage;
   wherein a gas discharge passage and a gas suction passage which are unidirectionally opened and have opposite opening directions are provided in the pressure balancer; a gas inlet end of the gas discharge passage is communicated with an inside of the storage chamber, and a gas outlet end of the gas discharge passage is communicated with an outside of the storage chamber; a gas outlet end of the gas suction passage is communicated with the inside of the storage chamber, and a gas inlet end of the gas suction passage is communicated with the outside of the storage chamber;
   wherein the gas inlet end of the gas discharge passage and the gas outlet end of the gas suction passage are communicated with the inside of the storage chamber respectively via a first port, and the gas outlet end of the gas discharge passage and the gas inlet end of the gas suction passage are communicated with an inside of a refrigerator compartment outside the storage chamber respectively via a second port.

2. The fresh drawer according to claim 1, wherein the drawer body comprises a cover body, a box body and a door body, wherein the box body is movable with respect to the cover body in a depth direction of a refrigerator to open or close the storage chamber, and the door body is provided at an outer side of the refrigerator in the depth direction and used for heat preservation.

3. The fresh drawer according to claim 1, wherein the base is used for mounting the check valves; a first check valve of the check valves in the gas discharge passage is provided to be opened outwards from the inside of the storage chamber; a second check valve of the check valves in the gas suction passage is provided to be opened inwards from the outside of the storage chamber.

4. The fresh drawer according to claim 3, wherein each of the first check valve in the gas discharge passage and the second check valve in the gas suction passage is provided in a vertical direction and comprises a valve body and a valve core bead, wherein an inner wall of the valve body contracts inwards radially to form an annular stop portion, and the valve core bead is laid on the stop portion and is matched with the stop portion to enable opening or closing of the each check valve.

5. The fresh drawer according to claim 1, wherein the second port is communicated with a ventilation pipeline, and the ventilation pipeline is communicated with an outside of the refrigerator.

6. A refrigerator, comprising a fresh drawer comprising:
a drawer body provided with a storage chamber within the drawer body for storing food, the storage chamber being of an openable sealed structure;
a gas supplier for supplying fresh-keeping gas to the storage chamber, and the gas supplier having a gas cylinder for storing fresh-keeping gas and a pressure relief valve connected to the gas cylinder;
a pressure balancer for balancing the gas pressure inside the storage chamber, and having a base and check valves;
wherein a gas supply compartment is provided in the drawer body for placement of the gas supplier, and the gas supply compartment is communicated with the storage chamber via a gas passage;
wherein a gas discharge passage and a gas suction passage which are unidirectionally opened and have opposite opening directions are provided in the pressure balancer; a gas inlet end of the gas discharge passage is communicated with an inside of the storage chamber, and a gas outlet end of the gas discharge passage is communicated with an outside of the storage chamber; a gas outlet end of the gas suction passage is communicated with the inside of the storage chamber, and a gas inlet end of the gas suction passage is communicated with the outside of the storage chamber;
wherein the gas inlet end of the gas discharge passage and the gas outlet end of the gas suction passage are communicated with the inside of the storage chamber respectively via a first port, and the gas outlet end of the gas discharge passage and the gas inlet end of the gas suction passage are communicated with an inside of a refrigerator compartment outside the storage chamber respectively via a second port.

7. The refrigerator according to claim 6, wherein the drawer body comprises a cover body, a box body and a door body, wherein the box body is movable with respect to the cover body in a depth direction of a refrigerator to open or close the storage chamber, and the door body is provided at an outer side of the refrigerator in the depth direction and used for heat preservation.

8. The refrigerator according to claim 6, wherein the base is used for mounting the check valves; a first check valve of the check valves in the gas discharge passage is provided to be opened outwards from the inside of the storage chamber; a second check valve of the check valves in the gas suction passage is provided to be opened inwards from the outside of the storage chamber.

9. The refrigerator according to claim 8, wherein each of the first check valve in the gas discharge passage and the second check valve in the gas suction passage is provided in a vertical direction and comprises a valve body and a valve core bead, wherein an inner wall of the valve body contracts inwards radially to form an annular stop portion, and the valve core bead is laid on the stop portion and is matched with the stop portion to enable opening or closing of the check valve.

10. The refrigerator according to claim 6, wherein the second port is communicated with a ventilation pipeline, and the ventilation pipeline is communicated with an outside of the refrigerator.

* * * * *